United States Patent [19]

Inaba et al.

[11] 4,431,366
[45] Feb. 14, 1984

[54] INDUSTRIAL ROBOT

[75] Inventors: Hajimu Inaba; Seiichiro Nakashima, both of Hino; Shigemi Inagaki, Musashino; Susumu Ito, Hino, all of Japan

[73] Assignee: Fujitsu Fanuc Limited, Tokyo, Japan

[21] Appl. No.: 307,329

[22] Filed: Sep. 30, 1981

[30] Foreign Application Priority Data

Sep. 30, 1980 [JP] Japan .................... 55-135260

[51] Int. Cl.³ .............................................. B25J 17/02
[52] U.S. Cl. ................................. 414/735; 414/718; 414/4; 414/738; 74/640
[58] Field of Search .............. 414/718, 751, 736, 738, 414/730, 735, 4, 1, 620, 641, 664, 668, 672; 74/640, 461

[56] References Cited

U.S. PATENT DOCUMENTS

Re. 28,437  6/1975  Devol et al. .............. 414/730 X
2,906,143   9/1959  Musser ..................... 74/640
3,784,031   1/1974  Niitu et al. ............... 414/735
4,274,802   6/1981  Inaba et al. ............... 414/730 X Primary Examiner—Robert J. Spar
Assistant Examiner—Terrance L. Siemens
Attorney, Agent, or Firm—Armstrong, Nikaido, Marmelstein & Kubovcik

[57] ABSTRACT

A wrist mechanism for an industrial robot having a robot casing, robot arms capable of extending from and contracting to the robot casing, a robot hand for gripping a workpiece, and a wrist arranged between the robot arms and the robot hand, comprises: two reduction gears with a high reduction ratio connected respectively to each of two high speed rotational driving motors, the two reduction gears cooperating with one another for generating two individual reduced rotational outputs, and; two transmitting mechanisms, connectable to the hand, for transmitting respectively the two reduced rotational outputs to the hand, thereby causing respectively rotational motion and swinging motion of the hand.

3 Claims, 6 Drawing Figures

INDUSTRIAL ROBOT

FIELD OF THE INVENTION

The present invention relates to an industrial robot operating as an industrial manipulating device. More particularly, the present invention relates to an industrial robot comprising a wrist mechanism which is provided with reduction means with a high reduction ratio and a special mechanism and is capable of causing the rotational motion and swinging motion of a robot hand simultaneously or alternately.

Generally, the industrial robot is provided with a robot hand attached to one end portion of a robot arm or arms which are capable of horizontally extending or contracting, and is also provided with a wrist mechanism arranged between the robot hand and the robot arm or arms for causing the rotational motion and swinging motion of the robot hand simultaneously or alternately.

Recently, the industrial robot has been employed more and more widely as an industrial manipulating device in various fields of industry. Particularly in the field of a machine tool, the industrial robot is employed as an industrial manipulation device for, for example, the purpose of attaching a workpiece or tool to and detaching the workpiece or tool from the machine tool. Therefore, the wrist mechanism portion with the robot hand of the robot is required to be compactly shaped for easy access to and operation within the restricted spaces of the machine tool.

For the purpose of making the wrist mechanism compact, most conventional industrial robots are provided with a wrist mechanism comprising a hydraulic system or a pneumatic system. Therefore, the above-mentioned conventional robots must be provided with a hydraulic or pneumatic power source for operating the hydraulic or pneumatic system, a piping system for guiding the hydraulic fluid or compress air, and required attachments thereto. This causes the robots to have undesirable problems, such as difficult controllability, troublesome maintenance and increased maintenance cost. Further, such an industrial robot must also be provided with electric motors for driving the above power sources, such as hydraulic motors or air compressors, and must be provided with electric apparatuses, such as solenoid controlled valves and others. As can be seen from the above-mentioned items, the conventional industrial robot has both an electric system and a hydraulic or pneumatic system. Particularly, the conventional industrial robot with the wrist mechanism having a hydraulic system requires expensive hydraulic fluid which must be used as expendable oil and so must be replaced periodically. Therefore, the design and manufacturing of such a conventional industrial robot becomes complex. Also, the manufacturing and maintenance of the robot becomes high in cost. For the above reasons, the conventional robot is not satisfactory.

In order to dispose of the above-mentioned undesirable problems, it is desired that an industrial robot comprises a wrist mechanism which has no hydraulic or pneumatic system, is compactly designed to fit in a small space, and is made of a reduction gear or gears operated by only an electric drive motor or motors. Generally, in order to realize such a wrist mechanism, the wrist mechanism should be driven by an electric drive motor or motors as high speed rotational driving sources through a driving shaft or shafts connected to the wrist mechanism and motor or motors. In this case, the motor or motors are attached to the rear end of a robot casing or to the rear end of a robot arm or arms slidably supported by the robot casing to be capable of extending or contracting, while the driving shaft or shafts are connected, at one end, to the motor or motors and are slidably engaged in the direction of the axis, at the other end thereof, with the wrist-mechanism via appropriate bearings. In the case of such an industrial robot, as the robot hand of the robot needs to have a high rotational force for rotational or swinging motion, the wrist mechanism is required to reduce, at a high reduction ratio, the high rotational speed of the motor or motors and to transmit the reduced rotational output with a high torque to the robot hand. Therefore, in order to reduce the high rotational speed of the motor or motors, one or more reduction gear(s) with a high reduction ratio must be mounted in the wrist mechanism or must be directly connected to the motor or motors. However, generally, in the case of the former, the wrist mechanism must have therein one or more reduction gear(s) composed of many various conventional gears operatively engaged with one another in order to get a high reduction ratio, and also it must have an individual reduction gear for operating the rotational and swinging motion of the robot hand. In addition, the wrist mechanism must have a device or devices for driving the individual reduction gear simultaneously and alternately. Therefore, the wrist mechanism becomes large in size because of the large size of the reduction gear. As a result of this, the wrist mechanism is unable to be formed compactly in a small space. Now, in the case of the latter or the reduction gear or gears directly connected to the motor or motors as mentioned above, the reduction gear or gears are required to transmit a high rotational force to a wrist mechanism through a driving shaft or shafts operatively connected between the reduction gear and the wrist mechanism. The driving shaft or shafts must be made very strong and large in diameter in order to withstand the high rotational force. Therefore, a robot arm or arms including the driving shaft or shafts must also be made very strong and large in diameter, and must be provided with accessory parts of a large size, such as, for example, bearings. Thus, the front portion of the robot arm or arms to be attached to the wrist mechanism occupies a large space. As a result of this fact, the wrist mechanism is forced to be large in size, rather than of a compact size. In addition, the wrist mechanism, robot arms and other parts result in an undesirable increase in the weight of the industrial robot. For the facts mentioned above, an industrial robot comprising a wrist mechanism a compact size has not been achieved until the present.

SUMMARY OF THE INVENTION

An object of the present invention is to provide an industrial robot which is provided with a novel wrist mechanism, including reduction gears with a high reduction ratio, made up compactly from the special mechanism and features of the reduction gears, driven by only electric drive motors, and capable of operating the rotational and swinging motion of the robot hand of the industrial robot simultaneously or alternately.

In accordance with the present invention, an industrial robot having a robot casing, robot arms capable of extending from and contracting to the robot casing, a robot hand for gripping a workpiece, and a wrist mechanism arranged between the robot arms and the robot hand, wherein the wrist mechanism is characterized by comprising: a first high speed rotational driving source; a second high speed rotational driving source; a first reduction means with a high reduction ratio, connected to the first high speed rotational driving source; a second reduction means with a high reduction ratio, connected to the second high speed rotational driving source; an arrangement wherein the first and second reduction means cooperate with one another for generating first and second individual reduced rotational outputs; a first transmitting means connectable to the hand for transmitting the first reduced rotational output to the hand, thereby causing rotational motion of the hand, and; a second transmitting means connectable to the hand transmitting the second reduced rotational output to the hand, thereby causing swinging motion of the hand. Preferably, the first and second reduction means, respectively, comprise a reduction gear with a high reduction ratio, which is known under the trade name of Harmonic Drive (reduction gear). The first harmonic drive may be rotatively engaged with the second harmonic drive through a pinion. Electric drive motors may be adopted as the first and second high speed rotational driving sources connected respectively to the first and second reduction means via ball spline shafts.

DESCRIPTION OF THE DRAWINGS

The above and other objects and features of the present invention will become apparent from the ensuing description of an embodiment with reference to the accompanying drawings, wherein:

It should be noted that the same reference numerals designate the same or like parts or elements, respectively in FIG. 1 through FIG. 5, and that herein the term "front" means the right-hand side when facing the drawings, and so the term "rear" means the left-hand side.

Referring now to FIG. 1 which illustrates an industrial robot provided with a wrist mechanism according to an embodiment of the present invention, the industrial robot has a base 10 fixed to the surface of the floor. On the base 10, a rotary table 12 is mounted. The rotary table 12 can be rotated by a drive device (not shown in FIG. 1) housed in the base 10. A pair of vertical guide pillars 14, 14' is fixed to the upper surface of the rotary table 12, and a vertical ball screw shaft 16 is rotatably supported on the upper surface of the rotary table 12. The lower end of the ball screw shaft 16 is rotatably connected to a vertical feed motor (not shown) mounted in the base 10. A robot casing 18 is slidably engaged with the guide pillars 14, 14' via an appropriate bearing means, and also threadedly engaged with the ball screw shaft 16. Therefore, the robot casing 18 is vertically moved in response to the rotation of the ball screw shaft 16 under the guide of the guide pillars 14, 14'. To the robot casing 18, a pair of robot arms 20, 20' is movably attached to be capable of horizontally extending and contracting. A wrist mechanism 22 according to the present invention is attached to the front ends of the robot arms 20, 20'. A robot hand 24 is attached to the front end of the wrist mechanism 22. The rotational and swinging motions of the robot hand 24 are operated by the wrist mechanism 22. Drive motors (referring FIG. 2) are housed in the rear portion of the robot casing 18, and by the motors the wrist mechanism is driven via driving shafts (referring to FIG. 2) incorporated in the inside of the robot casing 18.

Referring to FIG. 2 which is a partially sectional view of FIG. 1 and illustrates the inside portion of the robot casing 18, the robot arms 20, 20' and the wrist mechanism 22 of FIG. 1, the robot arms 20, 20' are respectively supported by bearings 18b, 18c and 18'b, 18'c so as to be capable of horizontally extending and contracting. The bearings 18b, 18'b and 18c, 18'c are respectively installed at the rear and front portions in the insides of the front cylindrical portions 18a, 18'a of the robot casing 18. To the front end of the robot arms 20, 20', the wrist mechanism 22 is attached, and is moved together with the arms 20, 20'. And also, to the rear end of the robot arms 20, 20', a plate 20a is rigidly fixed and is moved together with both the arms 20, 20' and the wrist mechanism 22. To the rear end of the robot casing 18, the first, second and third electric drive motors 26, 26' and 27, are arranged, as shown in FIG. 2. The first and second drive motors 26, 26' are used to drive, respectively the first and second reduction gears (not shown in FIG. 2) housed in the wrist mechanism 22, by way of ball spline shafts 28, 28' respectively connected to the motors 26, 26', and pipe shafts 30, 30' slidably engaged in the direction of the axis with the spline shafts 28, 28'. The above-mentioned first and second reduction gears respectively, comprise a harmonic drive (reduction gear) which is known under the trade name of Harmonic Drive, and has a special reduction-mechanism with an extremely high reduction ratio. The ball spline shafts 28, 28' are rotatably supported by both bearings 32a, 32'a attached to a bracket 32 rigidly fixed to the inside walls of the robot casing 18, and bearings 20b, 20'b attached in the plate 20a. The rear portions of the spline shafts 28, 28' are respectively connected to the motors 26, 26' via couplings 34, 34', while the front splined shaft portions of the above shafts 28, 28' are slidably engaged in the direction of the axes of the shafts with the pipe shafts 30, 30'. A ball screw shaft 36 is rotatably supported by both a bearing 32b attached to the bracket 32 and a bearing 18d attached, in the opposed position of the above bearing 32b, to the front wall of the robot casing 18. The screw shaft 36 is also connected, at the rear portion thereof, to the third drive motor 27 via a coupling 38, and is threadably engaged, at the middle portion thereof, with a ball nut 36a incorporated in the plate 20a. As a result of the above mentioned construction, the wrist mechanism is horizontally moved in and out in response to the rotation of the ball screw shaft 36 by way of the ball nut 36, plate 20a and robot arms 20, 20'.

FIG. 3 is an enlarged longitudinal sectional view illustrating in detail the construction of the wrist mechanism 22 of FIGS. 1 and 2. In FIG. 3, the first harmonic drive (reduction gear) comprises a driving wheel 40 named "Wave generator", connected to the pipe shaft 30 and formed in the shape of an ellipse, an inner wheel 42 named "Flexible spline" and made of a flexible material formed substantially in the shape of a cylinder, and a outer wheel 44 named "Circular spline", which is capable of attaining a high reduction ratio. The second harmonic drive, also, comprises the same kind of members as those of the above-mentioned first harmonic drive (reduction gear); that is, a driving wheel 40', an inner wheel 42' and a outer wheel 44', and has the same mechanism as that of the first harmonic drive.

Now, the structure and operating principle of the harmonic drive (reduction gear) will be described below with reference to FIGS. 4A and 4B. FIG. 4A is a front view schematically illustrating the first harmonic drive as observed in the direction of an arrow A illustrated in FIG. 3. FIG. 4B is a explanatory drawing which illustrates the condition in engagement with the outer teeth 42a of the inner wheel 42 and inner teeth 44a of the outer wheel 44 at the portion indicated by the symbol B in FIG. 4A.

Referring to FIG. 4A, the driving wheel 40 is formed in the shape of an ellipse and is slidably brought into contact with the inner peripheral surface 42b of the inner wheel 42 along the outer peripheral surface 40a thereof. As the inner wheel 42 is made of a flexible material and is formed in the shape of a thin cylinder, its contact-portion with the driving wheel 40 is kept deformed in the shape of an ellipse, as observed in the direction of the axies thereof, along the outer peripheral surface of the driving wheel 40 as shown in FIG. 4A. in FIG. 4A, therefore, if the driving wheel 40 is rotated in the direction of an arrow C and its outer peripheral surface 40a is slid along the inner peripheral surface 42b of the inner wheel 42, the above-mentioned contact-portion of the inner wheel 42 with the driving wheel 40 is continuously deformed along the outer peripheral surface 40a of the driving wheel 40. In other words, the contact-portion of the inner wheel 42 is continuously deformed, as if the axis of the major diameter of an ellipse is rotated in the direction of the arrow C, and in this case the engaged points between the outer surface (outer teeth 42a) of the inner wheel 42 and the inner surface (inner teeth 44a) of the outer wheel 44 travel in the direction of the arrow C along the inside of the outer wheel 44. As shown in FIG. 4A, the inner wheel 42 is provided with outer teeth 42a along the outer peripheral thereof. The outer wheel 44 is provided with outer teeth 44c along the outer peripheral surface thereof, and is provided with inner teeth 44a along the inner peripheral surface thereof. The inner teeth 44a are engaged with the outer teeth 42a at both end portions on the axis of the major diameter of the elliptical shape. The engaged points between the outer teeth 42a and inner teeth 44a are continuously traveled along the inner teeth 44a of the outer wheel 44 in response to the rotation of the driving wheel 40. In such a harmonic drive (reduction gear), generally, the inner wheel 42 is provided with two fewer outer teeth 42a than the inner teeth 44a of the outer wheel 44. For example, the inner wheel 42 has 198 outer teeth 42a, while the outer wheel 44 has 200 inner teeth 44a. Therefore, the pitch $P_1$ of the outer teeth 42a is slightly larger than the pitch $P_2$ of the inner teeth 44a by $\Delta P$, as shown in FIG. 4B. In FIG. 4B, when the inner wheel 42 is locked so that it can rotate while the outer wheel 44 is in a position to be freely rotated, the rotation of the driving wheel 40 in the direction of the arrow D (or clockwise) will cause the point in engagement with the outer teeth 42a and inner teeth 44a to travel from the position "a" to the position "b", so that the outer wheel 44 is rotated in a clockwise direction by $\Delta P$ against the inner wheel 42. In contrast with this, when the outer wheel 44 is locked so that it can not rotate while the inner wheel 42 is in a position to be freely rotated, the rotation of the driving wheel 40 in the direction of the arrow D (or clockwise) will cause the point in engagement with the outer teeth 42a and inner teeth 44a to travel from the position "a" to the position "b", so that the inner wheel 42 is rotated in a counterclockwise direction by $\Delta P$ against the outer wall 44. In each case of the above, if the driving wheel 40 is rotated in a counterclockwise direction, the outer wheel 44 and inner wheel 42 are respectively rotated in opposite directions against the rotational directions of the above-mentioned cases. When the inner wheel 42 and outer wheel 44, respectively, have 198 outer teeth and 200 inner teeth as mentioned above, this harmonic drive will get a high reduction ratio as described below: if the inner wheel 42 is locked so that it can not rotate, while the outer wheel 44 is freely rotatable, the outer wheel 44 is rotated, in the same direction of rotation as the rotational direction of the driving wheel 40, by 2/200 rotation per one rotation of the driving wheel 40; also, if the outer wheel 44 is locked so that it can not rotate, while the inner wheel 42 is freely rotatable, the inner wheel 42 is rotated, in the opposite direction of rotation against the rotational direction of the driving wheel 40, by 2/198 rotation per one rotation of the driving wheel 40. As mentioned above, such harmonic drive (reduction gear) is achieved compactly by a simple mechanism, provides a high reduction ratio in a small space and carries a reduced rotational output with a high torque.

Figure 1:
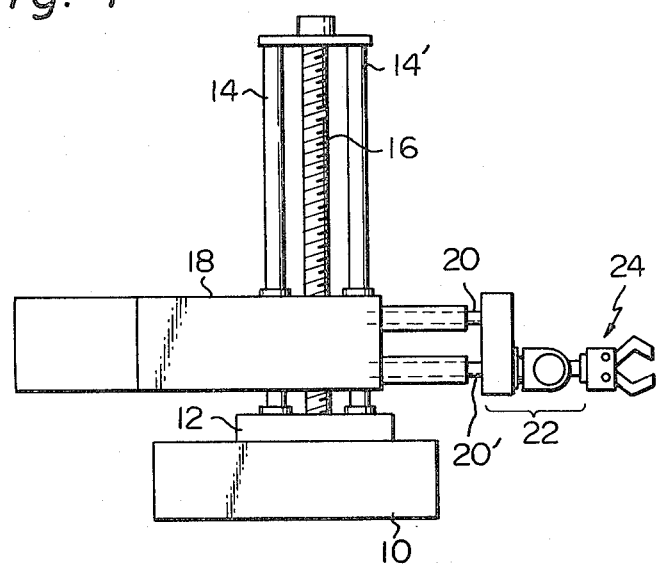
FIG. 1 is a side view illustrating the construction of an industrial robot having a wrist mechanism which is installed between a robot hand and robot arms, and is provided with a first and second harmonic drives (reduction gear), according to the present invention.
Figure 2:
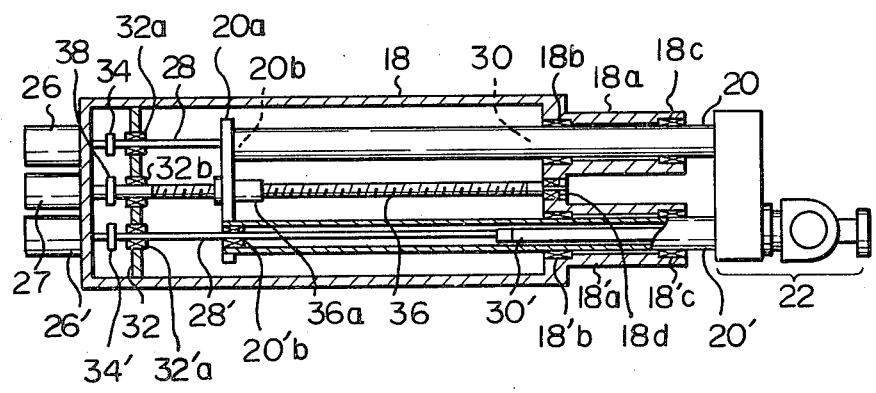
FIG. 2 is a longitudinal partial sectional view illustrating the construction of the wrist mechanism, robot arms and robot casing shown in FIG. 1.

Now, referring again to FIG. 3, the pipe shaft 30 is keyed, at its front portion, to transmit the rotational driving force of the first drive motor 26 (shown in FIG. 2) to the driving wheel 40 of the first harmonic drive. The inner wheel 42 is secured to a wrist casing 46 by a fixing member 48. The outer wheel 44 is rotatably supported by bearings 46a, 46b attached to the inside of the wrist casing 46 and is engaged with a pinion 50 through its outer teeth 44c. The pinion 50 is rotatably supported by a shaft 52 rigidly fixed to the wrist casing 46 via bearings 54'. The outer wheel 44' of the second harmonic drive (reduction gear) is rotatably supported by bearings 46'a, 46'b attached to the wrist casing 46 and also is engaged with the pinion 50 through its outer teeth 44'c. To the front end of the outer wheel 44', a bevel gear box 54 is rigidly fixed by a fixing member 54a. The pipe shaft 30' is keyed, at its front portion, to transmit the rotational driving force of the second drive motor 26' (shown in FIG. 2) to the driving wheel 40' of the second harmonic drive. The inner wheel 42' is rigidly fixed, at its front end, to the rear end of a shaft 58 by fixing members 58a. The shaft 58 is rotatably supported by bearings 56, 56' attached to the inside of the extending front portion of the outer wheel 44'. At the front portion of the shaft 58, a bevel gear 60 is formed in one piece with the shaft 58. The bevel gear 60 is engaged with another bevel gear 64 which is formed in one piece with a bracket 62 for fixing thereto a robot hand. The bevel gear 64 with the bracket 62 is rotatably supported by the bevel gear box 54 via an appropriate bearing means.

Figure 3:
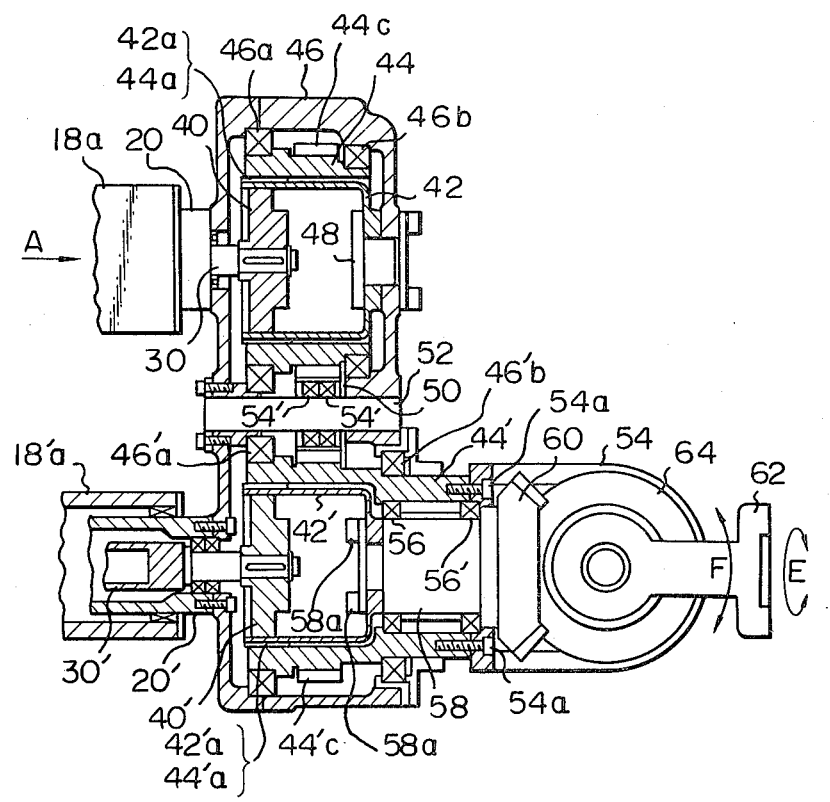
FIG. 3 is an enlarged longitudinal sectional view illustrating the construction of the wrist mechanism shown in FIG. 1 and 2.
Figure 4A:
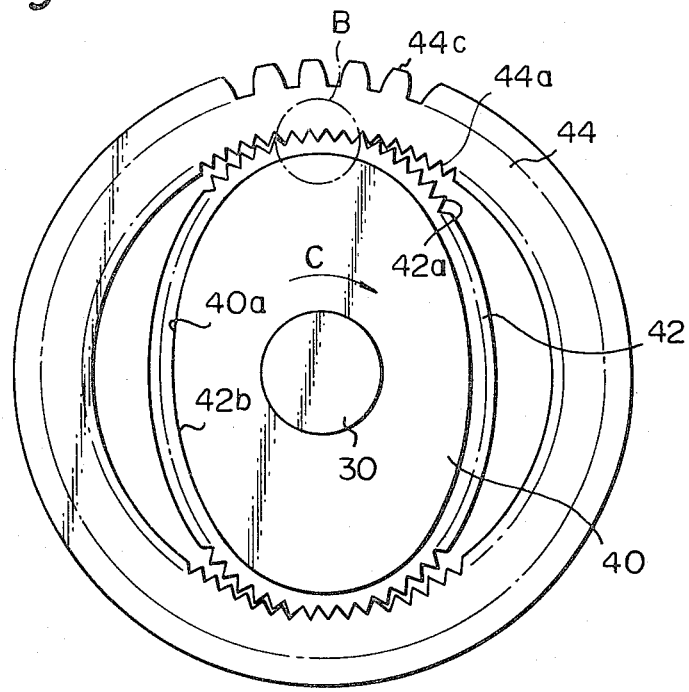
FIG. 4A is a front view schematically illustrating the first harmonic drive (reduction gear) as observed in the direction of an arrow A illustrated in FIG. 3.
Figure 4B:
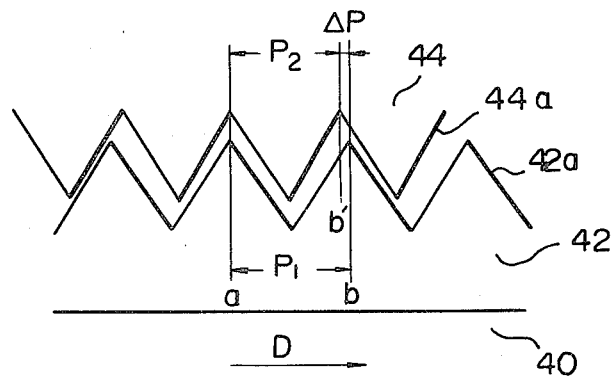
FIG. 4B is an explanatory drawing illustrating the condition of engagement with the inner and outer wheels at the portion indicated by a symbol B shown in FIG. 4A.
Figure 5:
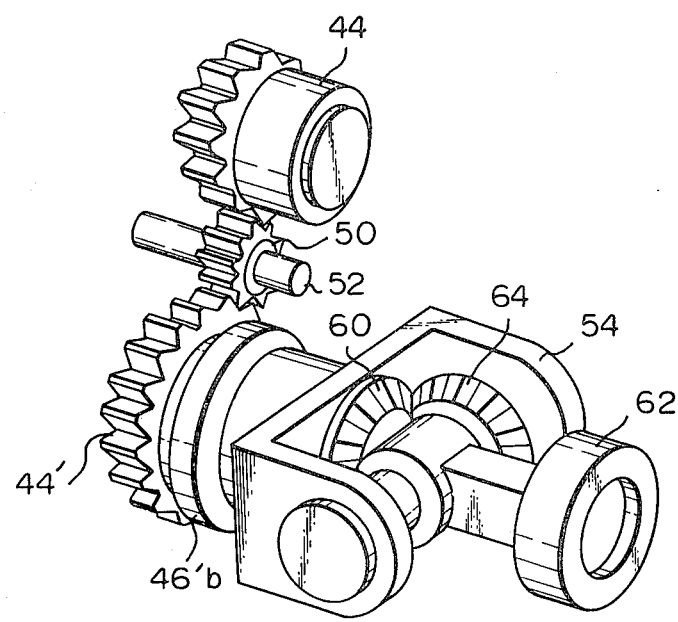
FIG. 5 is a perspective view illustrating the construction in engagement with the first and second harmonic drives (reduction gear) and the bevel gear housing, shown in FIG. 3.

According to the present invention, the wrist mechanism 22 is compactly formed in such a structure as stated above. The principle for producing the rotational and swinging motions of the robot hand will be described in detail below. Firstly, the rotational motion of the hand is operated as follows. Referring FIG. 3, the driving wheel 40 is driven at a high rotational speed by the pipe shaft 30, which drives the outer wheel 44 at an extremely reduced rotational speed through the outer teeth 42a and inner teeth 44a since the inner wheel 42 is locked so that it can not rotate, as mentioned in FIG. 4. The outer wheel 44 causes the outer wheel 44' to rotate via the pinion 50. Therefore, the bevel gear box 54 fixed to the outer wheel 44' is rotated in the directions of the arrow E, so that the robot hand (not shown in FIG. 3) is rotated via the bracket 62. In this case, the inner wheel 42' is moved together with the outer wheel 44' since the outer teeth 42'a of the wheel 42' are engaged with the inner teeth 44'a of the wheel 44'. This rotational motion of the robot hand is substantially operated by the first drive motor (shown in FIG. 2). Secondly, the swinging motion of the hand is operated as follows. Referring to FIG. 3, because the outer wheel 44' is in a locked condition when the wheel 44' is at rest, the driving wheel 40', driven at a high rotational speed by the pipe shaft 30', drives the inner wheel 42' at an extremely reduced rotational speed through the inner teeth 44'a of the wheel 44' and outer teeth 42'a of the wheel 42' in the opposite direction of rotation against the rotational direction of the driving wheel 40'. This inner wheel 42' transmits the rotational driving force to the bevel gear 64 through the shaft 58 and bevel gear 60. By the rotating motion of the bevel gear 64, the bracket 62, which is an integral part of the gear 64, is swing in the direction of the arrow F. Now, when the outer wheel 44' is in rotation that is to say, the robot hand is in rotational motion, the outer wheel 44' can be regarded as being in a similarly locked condition in comparison with the driving wheel 40' driven at a high rotational speed, because the wheel 44' is rotated at an extremely reduced rotational speed, as stated above. Therefore, in this instance, the driving wheel 40' also drives the inner wheel 42' at an extremely reduced rotational speed in the opposite direction of rotation against the rotational direction of the driving wheel 40', so that the robot hand is also swung in the direction of the arrow F through the inner wheel 42' and others, under the same principle as mentioned above. In this case, this swinging motion of the robot hand can be produced simultaneously with the rotational motion of the hand. FIG. 5 is a perspective view illustrating the state in engagement with the first and second harmonic drives through the pinion 50, the bevel gear housing 54, the bevel gears 60, 64 and the bracket 62 in order that the construction of the wrist mechanism according to the present invention will be more exactly understood.

From the foregoing description of the embodiment of the present invention, it will be understood that the wrist mechanism of the industrial robot can be formed compactly in a small space without a hydraulic system or pneumatic system. Therefore, the industrial robot can be formed with a simpler construction than the conventional industrial robots. As a result, the design and manufacturing of an industrial robot becomes easy. Also, the manufacturing and maintenance of an industrial robot can be low in cost.

We claim:

1. An industrial robot having a robot casing, an arm extensible from and contractable into said casing, and a wrist mechanism arranged on said arm and having a hand attached thereto, said wrist mechanism comprising:
   a first high speed rotational driving source;
   a first harmonic drive connected to said first high speed rotational driving source;
   a first transmitting means connected between said first harmonic drive and said hand, for causing rotational movement of said hand;
   a second high speed rotational driving source;
   a second harmonic drive connected to said second high speed rotational driving source;
   a second transmitting means connected between said second harmonic drive and said hand for causing swinging movement of said hand;
   each of said first and second harmonic drives being comprised of a driving wheel driven by its respective high speed rotational driving source, a flexible inner wheel having an inner peripheral surface slidably engaged with said driving wheel and a toothed outer peripheral surface, and an outer wheel having a toothed inner peripheral surface engaged with said toothed outer peripheral surface of said inner wheel and a toothed outer peripheral surface, whereby a highly reduced rotation is transmitted through said flexible inner wheel to said outer wheel;
   said first transmitting means comprising a pinion engaged between said toothed outer peripheral surface of said outer wheel of said first harmonic drive and said toothed outer peripheral surface of said outer wheel of said second harmonic drive to transmit rotational movement to said hand.

2. An industrial robot as claimed in claim 1, wherein said wrist mechanism further comprises a wrist casing housing said first and second harmonic drives in parallel relationship to each other.

3. An industrial robot as claimed in claim 1, wherein said first and second high speed rotational driving sources comprise first and second electric drive motors, respectively, positioned at the rear of said robot casing, each of said motors being connected to its respective harmonic drive by means of a ball spline shaft.

* * * * *